United States Patent [19]

Berkey

[11] Patent Number: 4,807,959
[45] Date of Patent: Feb. 28, 1989

[54] METHOD OF SPLICING FIBERS

[75] Inventor: George E. Berkey, Pine City, N.Y.

[73] Assignee: Corning Glass Works, Corning, N.Y.

[21] Appl. No.: 82,681

[22] Filed: Aug. 7, 1987

[51] Int. Cl.⁴ ............................................. G02B 6/38
[52] U.S. Cl. ............................... 350/96.21; 350/96.20
[58] Field of Search ................ 350/96.20, 96.21, 96.22

[56] References Cited

U.S. PATENT DOCUMENTS

| | | | |
|---|---|---|---|
| 4,033,668 | 7/1977 | Presby | 350/96.21 |
| 4,179,186 | 12/1979 | Tynes | 350/96.21 |
| 4,257,674 | 3/1981 | Griffin et al. | 350/96.21 |
| 4,422,717 | 12/1983 | Schmidt | 350/96.21 |
| 4,448,483 | 5/1984 | Pyley | 350/96.21 |
| 4,519,672 | 5/1985 | Rogstadius | 350/96.21 |
| 4,537,468 | 8/1985 | Degoix et al. | 350/96.21 |
| 4,544,234 | 10/1985 | De Vean et al. | 350/96.21 |
| 4,585,304 | 4/1986 | Winter et al. | 350/96.21 |
| 4,647,150 | 3/1987 | De Santi et al. | 350/96.21 |
| 4,687,291 | 8/1987 | Stape et al. | 350/96.21 |
| 4,712,862 | 12/1987 | Lightstone | 350/96.21 |

FOREIGN PATENT DOCUMENTS

| | | | |
|---|---|---|---|
| 0061423 | 9/1982 | European Pat. Off. | 350/96.21 |
| 2814090 | 10/1978 | Fed. Rep. of Germany | 350/96.21 |
| 3429626 | 2/1986 | Fed. Rep. of Germany | 350/96.21 |

*Primary Examiner*—William L. Sikes
*Assistant Examiner*—Robert E. Wise
*Attorney, Agent, or Firm*—Walter S. Zebrowski

[57] ABSTRACT

The method of forming an optical fiber splice is described wherein a hollow cylindrical glass member is provided, the member having a bore along the longitudinal axis thereof. The member is formed with tapered, funnel-like apertures at each end thereof for improved insertion of optical fibers. Optical fibers are inserted into the ends of the splicing member and cemented in place.

3 Claims, 1 Drawing Sheet

METHOD OF SPLICING FIBERS

CROSS-REFERENCE TO RELATED APPLICATION

This application is related to my U.S. patent application Ser. No. 082,680, entitled "Capillary Splice and Method" filed on even date herewith.

BACKGROUND OF THE INVENTION

The present invention relates to the method of splicing optical fibers together using capillary splices and more particularly to an economic method of splicing optical fibers and the resulting article.

Optical fibers, such as optical waveguides, have a glass core and a cladding surrounding the core having a refractive index less than that of the core material. Some optical fiber systems require splices such that at least a portion of the energy propagating in one fiber may be transmitted to at least one other fiber.

Optical fibers may be single-mode where the core diameter is of just one or a few microns or multimode fibers having core diameters significantly larger.

An elastomeric fiber optic spliced is described in U.S. Pat. No. 4,257,674. This fiber optic splice has a fiber receiving member formed in a pair of sections such that, when assembled, it provides an external polygonal shaped surface. These sections have complimentary and mating planar surfaces in engagement with one another. One of the planar surfaces has an axially aligned V-shaped groove formed therein facing the other of the planar surfaces thereby forming an opening therebetween. The fiber receiving member is formed of an elastomeric material of sufficient resilience to permit the groove opening to expandably receive optical fibers dimensioned larger than the opening. A cylindrically shaped sleeve is disposed about the elastomeric receiving member surrounding the polygonal shaped surface and holding the two sections of the member in an assembled relationship. As fibers are inserted into the groove, they are maintained in place by the resilient properties of the two piece elastomer member.

Another optical fiber splice is the Norland self aligning UV curable splice and the Lightlinker fiber optic splice system. These splices include a central glass alignment guide composed of four tiny glass rods which have been fused together to provide a hollow core containing four V-grooves at the fused tangential points. The ends of the guide are bent somewhat along the longitudinal axis. This forms a fiber deflecting elbow on either side of a straight central portion of the guide. When fibers are inserted into the guide, the upward or downward slope of the ends forces the fibers to orient themselves in the uppermost or lowermost V-grooves of the guide, respectively. When the fibers meet at the center portion, both are tangent to the guide surfaces so that the ends thereof abut each other. The splice is used by first filling the central opening with a UV curing optical adhesive. After the fibers are prepared by stripping any exterior resin coating and squaring-off the ends, they are inserted into the splice so as to be aligned when they contact each other. Exposure to UV light cures the adhesive encapsulating the fiber providing handling strength.

Some of the problems and disadvantages with prior art splicing methods are the complexity and cost thereof. Such splicing methods require assembling various components. Alternatively, the splices are made of elastomeric material which may be less stable chemically and has a high expansion. Prior art splicing methods are simply more complicated and costly to effect. In addition, many of the prior art splicing steps are highly labor intensive and, therefore, add greatly to the cost of splicing fibers.

For teaching of forming optical waveguides or other optical fibers reference is hereby made to U.S. Pat. Nos. 3,659,915 to R. D. Maurer and P. C. Schultz, 3,711,262 to D. B. Keck and P. C. Schultz, 3,737,292 to D. B. Keck, P. C. Schultz and F. Zimar, 3,737,293 to R. D. Maurer, 3,775,075 to D. B. Keck and R. D. Maurer, 3,806,570 to J. S. Flamenbaum, P. C. Schultz, and F. W. Voorhees, 3,859,073 to P. C. Schultz, and 3,884,550 to R. D. Maurer and P. C. Schultz, all of which patents are hereby expressly incorporated herein by reference.

SUMMARY OF THE INVENTION

In view of the foregoing state of the art, it is an object of the present invention to provide an improved method of splicing fibers. In particular, it is an object of the present invention to provide a reliable and inexpensive method of splicing optical fibers which will overcome the heretofore noted disadvantages of the prior art. More particularly, it is an object of the present invention to provide a method for splicing optical waveguides which is reliable and results in a low loss fiber splice.

Briefly, according to the present invention, a hollow cylindrical glass splice member is provided having a bore along the longitudinal axis thereof. The splice member further comprises a tapered aperture in each end portion thereof tapered inwardly to merge with said bore.

To facilitate proper fiber splicing, the bore of the cylindrical splice member or splice must be only a little larger than the outside diameter of the fiber and preferably only one or a few microns larger than the diameter of the fiber. The hollow cylindrical member may be drawn to achieve the proper bore diameter before the splice is formed.

Most fibers have a resin coating on the exterior thereof to protect the exterior surface of the optical fiber. A preferred method of splicing such fibers necessitates the removal of the resin material from the exterior of the fiber for that portion of its length which will be inserted into the splice. Removal of the resin will permit better dimensional control over the fiber resulting in the most efficient splicing of the optical fibers.

Thereafter, the fiber ends having the resin removed, are inserted into the tapered apertures at each end of the splice until they meet intermediate the ends thereof. A quantity of adhesive is then placed in each tapered aperture surrounding the extending fiber so as to permit it to be affixed to the splice. After the adhesive is cured, the fibers remain rigidly attached to the splice with the ends abutting each other intermediate the ends of the splice.

To facilitate better light transmission from one fiber to the other, the bare fiber ends may be dipped in an optical oil before inserting them into the splice to increase the light transmission efficiency from one fiber to the other. Also, the ends of the fibers to be spliced may be square cut to facilitate better light transmission.

Further features and advantages of the present invention are that the present method of splicing fibers is very inexpensive, provides a very stable splice chemically, has a very low thermal expansion coefficient, provides a structurally strong splice, and can be rapidly performed in the field.

These and additional objects, features and advantages of the present invention will become apparent to those skilled in the art from the following detailed description and the accompanying drawing, which is incorporated and constitutes part of the present specification, on which, by way of example, only the preferred embodiments of this invention are illustrated.

DESCRIPTION OF THE PREFERRED EMBODIMENTS

It is to be noted that the drawings are illustrative and symbolic of the present invention and there is no intention to indicate scale or relative proportions of the elements shown therein.

Figure 1:
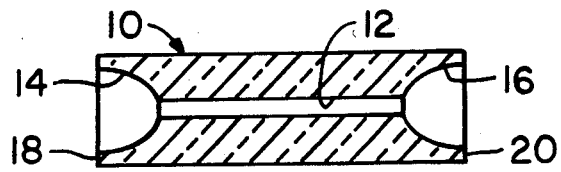
FIG. 1 is a cross-sectional view of a splice in accordance with the present invention.

Referring to FIG. 1, there is provided a hollow glass cylindrical member or splice 10. Although the preferred glass is silica, any workable and stable glass may be used as the material for member or splice 10. A longitudinal aperture or bore 12 is provided along the longitudinal axis of hollow cylindrical member or splice 10. In particular, hollow cylindrical member or splice 10 may comprise a capillary tube with tapered, funnel-like apertures 14 and 16 formed in each end surface 18 and 20 thereof respectively. Glass member 10 may be formed as taught in my companion application entitled "Capillary Splice and Method", Ser. No. 082,680, filed on Aug. 7, 1987, which application is incorporated herein by reference. Tapered apertures 14 and 16 form funnel-like entrances to bore 12 at end surfaces 18 and 20 of splice 10 respectively. It is important to note that funnels or tapered apertures 14 and 16 are necessary for ease of insertion of a fiber into bore 12 as herein described. Under practical circumstances, bore 12 may be only 2 or a few microns larger than the outside diameter of a stripped fiber, wherefore, insertion thereof into bore 12 would be extremely difficult without tapered apertures 14 and 16.

To facilitate proper fiber splicing, the diameter of bore 12 of splice 10 must be less than two times the outside diameter of the fiber and generally is only one or a few microns larger than the outside diameter of the fiber. As will be understood, if the diameter of bore 12 is greater than two times the outside diameter of the fiber, the fibers may be inserted in bore 12 such that they may pass by one another rather than have the ends thereof abut each other. To achieve the proper diameter of bore 12, the hollow cylindrical member or splice 10 as illustrated in FIG. 1 may be drawn as described in my said companion application Ser. No. 082,680. In this manner, member 10 may be drawn to achieve the desired proper bore diameter before the splice is formed.

Figure 2:
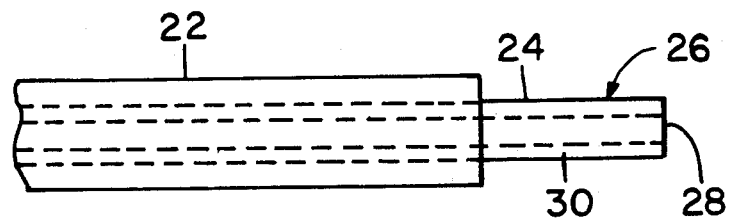
FIG. 2 is a front elevation of an optical fiber having a portion of the resin coating removed therefrom.
Figure 3:
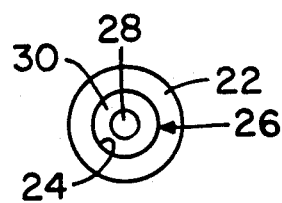
FIG. 3 is an end elevation of the fiber of FIG. 2.

Referring additionally to FIGS. 2 and 3, most fibers have a resin coating 22 on the exterior thereof to protect exterior surface 24 of optical fiber 26. Optical fiber 26 comprises core 28 and cladding 30. A preferred method of splicing such fibers necessitates the removal of resin coating 22 from the exterior of fiber 26 for at least that portion of its length which will be inserted into the bore of splice 10. Removal of resin coating 22 will permit better dimensional control over the fiber resulting in the most efficient coupling between optical fibers. Coating 22 may be removed by mechanical stripping or chemical solvents. An example of a suitable solvent for removing a urethane acrylate resin coating is methylene chloride. Suitable solvents for usable resin coatings are known in the art.

Figure 4:
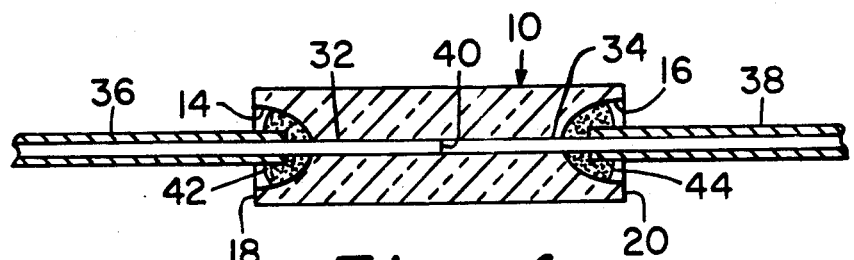
FIG. 4 is a cross-sectional view of a pair of fibers connected together by the splice of the present invention.
Figure 5:
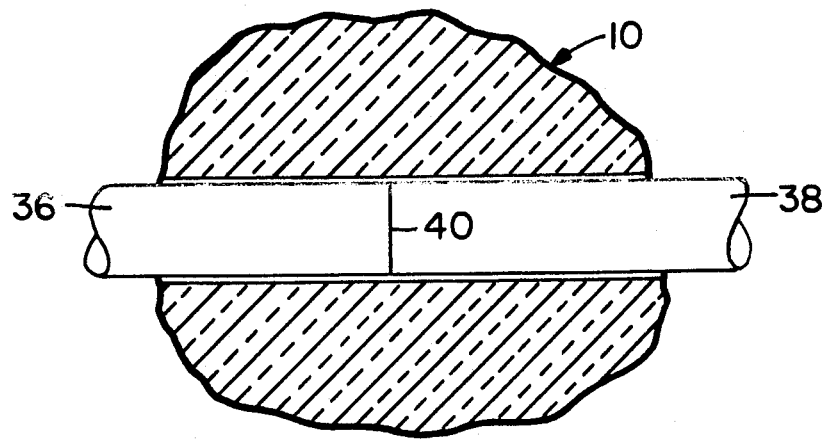
FIG. 5 is an enlarged view of the fiber ends joined in the splice of FIG. 4.

Thereafter, the uncoated portions 32 and 34 of coated fibers 36 and 38 are inserted into tapered apertures 14 and 16 respectively at each end of splice 10 until they meet intermediate the end surfaces 18 and 20 of said splice as illustrated by reference numeral 40 shown in FIGS. 4 and 5. A quantity of adhesive or cement 42 and 44 is then disposed in apertures 14 and 16 respectively surrounding the extending fibers so as to permit the fibers to be affixed to splice 10 while the ends of fibers 36 and 38 meet intermediate the ends of splice 10 as shown by reference numeral 40. After adhesive or cement 42 and 44 is cured, fibers 36 and 38 remain rigidly attached to splice 10 with the ends thereof abutting each other intermediate the ends of the splice.

It will be understood that it is preferable to have the resin coating removed from the fibers within bore 12 to facilitate better alignment of the fibers, however, it is preferable to have the coated portion of fibers 36 and 38 extended into tapered apertures 14 and 16 respectively so that such coated portions are contacted by adhesive or cement 42 and 44 providing high structural integrity to the resulting splice.

To facilitate better light transmission from one fiber to the other, the bare fiber ends may be dipped in an optical oil, not shown, before inserting them into the splice to increase the light transmission efficiency from one fiber to the other. Such optical oil may be silicone oil or silicone grease as is well known in the art.

A typical example of the present invention is as follows. A hollow glass cylindrical member or splice was formed with tapered, funnel-like apertures in the ends thereof as taught in my copending application "Capillary Splice and Method", Ser. No. 082,680 files on even date herewith. The splice was 1" in length and had a longitudinal bore diameter of 127 $\mu$m.

Two fibers having an outside diameter of 125 $\mu$m and a urethane acrylate resin coating were provided. The fibers comprised a core and cladding. The coating was removed from the ends of the fibers for a distance of about 5 inches by means of applying thereto a resin solvent of methalene chloride. The outside diameter of splice losses measured on such splices for single-mode fibers were typically in the 0.2 to 0.3 db/km. range.

Another example of the present invention resulted by dipping each end of two fibers being joined as described in the preceding example in a silicone optical oil. The fiber ends were then inserted into the splice as described above with a film of the optical oil being present at the point where the fiber ends abutted each other. In repeating the signal transmission as noted in the preceding example, it was found that the losses through this splice were as low as 0.0 db/km.

The present invention has been particularly shown and described with reference to preferred embodiments thereof, however, it will be understood by those skilled in the art that various changes in the form and details may be made therein without departing from the true spirit and scope of the invention as defined by the following claims.

I claim:

1. A method of splicing fibers comprising the steps of providing a hollow glass splice member having a longitudinal bore,
   said splice member defining a tapered, funnel-like aperture in each end thereof communicating with said longitudinal bore, providing a pair of optical fibers comprising a core and cladding, and having an exterior protective resin coating thereon, removing said exterior protective resin coating from the ends of said fibers, inserting the uncoated end of one of said fibers into said longitudinal bore of said splice member from one end thereof to a depth such that the resin coated portion of the fiber extends into and is in part disposed within said tapered, funnel-like aperture in said one end of said splice member, inserting the uncoated end of the other fiber into said longitudinal bore of said splice member from the other end thereof to a depth such that the resin coated portion of said other fiber extends into and is in part disposed within said tapered, funnel-like aperture in said other end of said splice member while the ends of said fibers simultaneously abut each other intermediate the ends of said splice member, applying a quantity of adhesive to and abut each end of said splice member and within each said tapered, funnel-like aperture thereby surrounding each respective fiber including a resin coated portion of each said fiber so as to affix each said fiber to said splice member, and curing said adhesive.

2. The method of claim 1 wherein the diameter of said longitudinal bore is from 0.1 micron to 10 microns larger than the outside diameter of said uncoated fiber.

3. The method of claim 1 further comprising the step of dipping the uncoated ends of said fibers into optical oil before inserting in said longitudinal bore.

* * * * *